Figure 2A:
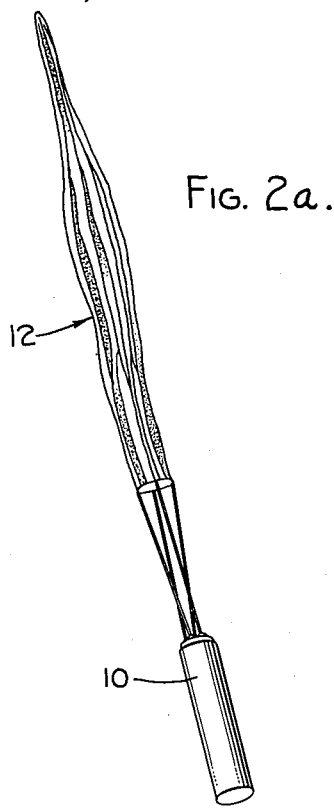

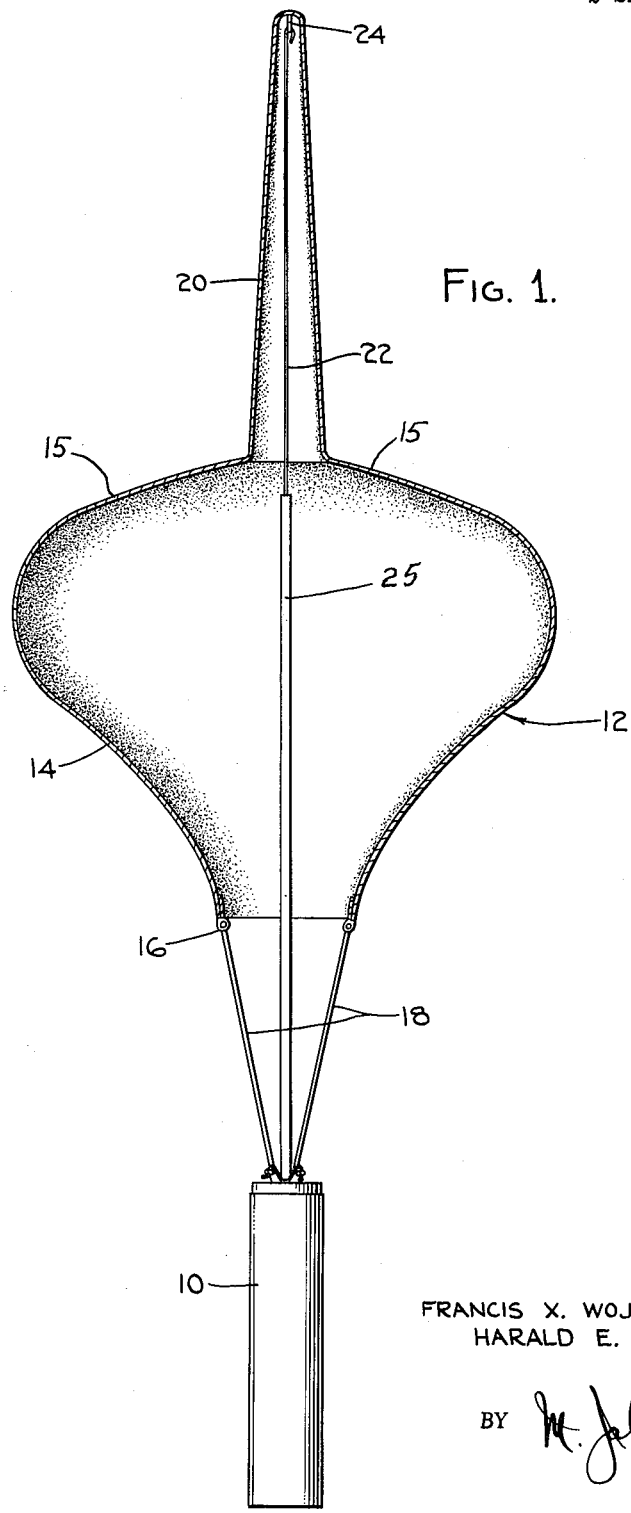

Feb. 8, 1966  F. X. WOJCIECHOWSKI ETAL  3,234,503
DRAG CHUTE AND FLOTATION DEVICE
Filed March 27, 1963  2 Sheets-Sheet 2

FRANCIS X. WOJCIECHOWSKI
HARALD E. KARLSON
INVENTORS.

BY *M. Jahn*

ATTORNEY.

United States Patent Office 3,234,503
Patented Feb. 8, 1966

3,234,503
DRAG CHUTE AND FLOTATION DEVICE
Francis X. Wojciechowski, Garden Grove, and Harald E. Karlson, Santa Monica, Calif., assignors to Hoffman Electronics Corporation, a corporation of California
Filed Mar. 27, 1963, Ser. No. 268,405
4 Claims. (Cl. 340—2)

The present invention relates to an improved unit for articles and equipment dropped from an aircraft, or the like, into a body of water; and the invention relates more particularly to an improved unit which is capable of functioning as an air brake while the article is falling and of functioning as a buoyant flotation means for the article after it has fallen into the water.

In dropping equipment such as sonobuoys from aircraft, or the like, it is usually necessary to provide some means, such as a drag parachute, to hold down the rate of descent of the equipment to a reasonably low velocity. In many applications, moreover, where equipment is to be dropped into a body of water, it is required that some flotation means be provided to maintain the equipment at or near the surface of the water after it has been dropped.

In the past, the usual practice has been to provide a parachute to serve as a drag brake during the descent of the falling equipment, and to provide an independent gas-filled balloon to prevent the equipment from submerging once it has fallen into the water.

An object of the present invention is to provide an eminently simple unit which is capable of performing both the functions of the prior art air brake during the descent of the equipment, and of the prior-art gas-filled balloon to provide buoyancy for the equipment after it has fallen into the water.

The embodiment of the invention to be described is formed of an airtight material and it has, for example, a generally inverted balloon-like pear shape. The lower extremity of the embodiment is open to provide a mouth portion of restricted diameter. Appropriate shroud lines are provided to suspend the equipment from the lower extremity of the unit. As the unit of the invention is drawn through the atmosphere by the following equipment, it gradually fills and becomes inflated with ram-jet air.

The inflated unit of the invention has a shape to provide the desired air-braking action, so as to hold the velocity of the falling equipment at a relatively low level as is desired. Then, when the equipment enters the body of water into which it is being dropped, it drags the open mouth portion at the lower end of the inflated unit down under the surface of the water. This causes the air in the unit to be trapped, so that sufficient buoyancy is provided to prevent the equipment from submerging down to the bottom of the body of water. In addition, the trapped air pressure maintains the antenna tower in the required erect position.

The assembly of the invention is particularly advantageous in that when the equipment is first dropped, the assembly streams freely until it gradually fills with air. This means that there is less tendency for the equipment to drift to any material extent from the target area. The assembly of the invention then gradually fills with the ram-jet air so as to slow the speed of descent of the equipment to a desired velocity before it reaches the surface of the body of water.

The assembly of the invention will be illustrated and described herein as applied to a radiosonic buoy. It will become evident as the description proceeds, however, that the invention finds general utility for equipment and articles of a wide range of types and variations; and in each instance the assembly of the invention serves to slow the descent of the dropped article, and it also serves as a flotation means for the article after it has fallen into the body of water.

Figure 2B:
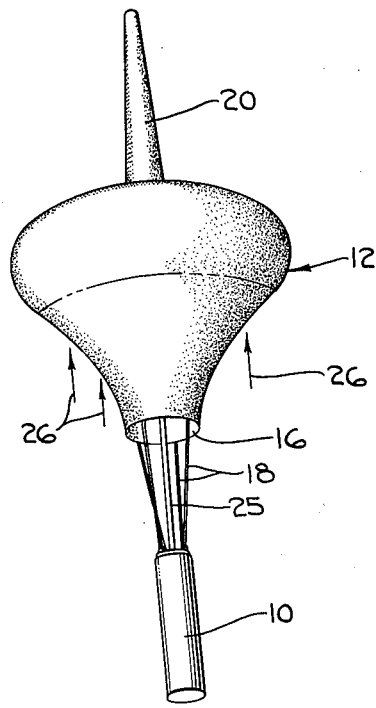
Figure 2C:
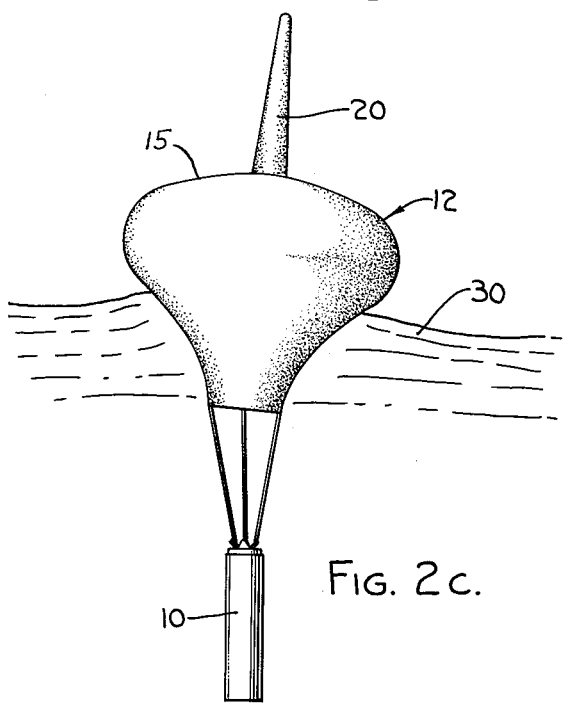

The features of the invention which are believed to be new are set forth with particularity in the claims. The invention itself, however, together with further objects and advantages thereof, may best be understood by reference to the accompanying drawings in which:

FIGURE 1 is a side elevational view, partly in section, of an embodiment of the present invention; and FIGURES 2a, 2b, and 2c are diagrammatic representations of the manner in which the assembly of the invention operates, and the manner in which it serves as a flotation means for the equipment after it has been dropped into a body of water.

Radiosonic buoys are generally provided with a small transmitter unit and an antenna. In addition, a microphone extends from the buoy down into the water, and the microphone is electrically coupled to the input of the transmitter. The microphone is capable of picking up sound signals produced, for example, by the propeller of a submarine, or other vessel. These sound signals are converted to electrical signals by the microphone and are fed to the transmitter. The signals are used therein to modulate a carrier wave. The modulated carrier wave is transmitted by the transmitter to a suitable receiving station.

In the drawings, a radiosonic buoy unit 10 is illustrated as the equipment connected to the assembly, or unit, of the invention. The assembly of the invention includes a balloon-like member 12. The balloon-like member 12 has a body portion 14, and it includes a restricted open-mouth portion 16 at the lower extremity of the body portion 14. The body portion 14 has a generally pear-like configuration, as shown in FIGURE 2. The diameter of the restricted open-mouth portion 16 is substantially smaller than the diameter of the body portion 14. A ratio of approximately 2 or 3:1 has been found to be preferable.

A plurality of shroud lines 18 are affixed to the balloon-like member 12 at the lower end of the body portion 14. These shroud lines are attached to the balloon-like member, for example, at positions spaced around the restricted open-mouth portion 16. The shroud lines 18 are coupled to the article to be dropped, such as the radiosonic buoy unit 10, so that the buoy unit may be suspended from the lower end of the balloon-like member.

A collapsible tower 20 is mounted on the crown or upper extremity of the balloon-like member 12, and it may be formed so as to be integral with the balloon-like member 12. The interior of the tower 20 is coupled to the interior of the body portion 14, as best shown in FIGURE 1. The balloon-like member 12 and the tower 20 may be formed of a suitable collapsible airtight material. For example, nylon coated with artificial rubber has been found well suited for this purpose.

An antenna 22 for the radiosonic buoy 10 is electrically coupled to the buoy, and the antenna extends through the body portion 14, and up into the tower 20. As illustrated, the antenna 22 is affixed to the top of the tower 20 by a suitable mounting means, as by looping it around flap 24, and is insulated at its lower extremity from the water by insulation sheath 25.

As best shown in FIGURES 2a, 2b, and 2c, when the assembly of the invention is dropped from an aircraft, or the like, it initially falls freely (FIGURE 2a) as the balloon-like member 12 streams behind the suspended unit 10. During the descent, however, ram-jet air enters through the open-mouth portion 16, and into the interior of the balloon-like member 12 and of the tower 20. The balloon-like member and tower fill with air (FIGURE 2b), and the balloon-like member serves as a drag brake to slow the descent of the suspended equipment or article, such as the buoy 10. The drag braking results from the fact that the air stream collides with the external surface of the balloon-like member, as shown by arrows 26. Thus, balloon-like member 12 does not merely serve as a parachute.

When the buoy 10 sinks below the surface of a body of water 30, into which the assembly has fallen, the buoy 10 drags the balloon-like member 12 after it. This causes the open restricted mouth portion of the balloon-like member to be drawn below the surface. The air in the balloon-like member 12 is trapped, and this enables the balloon-like member to provide sufficient buoyancy to maintain the buoy 10 in position near the surface of the body of water 30. In addition, the trapped air in the collapsible tower 20, which is pressurized by the small amount of water which enters through the mouth portion, causes the tower to maintain its rigid inflated condition, as shown in FIGURE 2c, so that an appropriate support is provided for the antenna 22.

In order to prevent the motion of the antenna caused by the bobbing balloon-like member 12 from working against the ground plane of the water and thereby changing the shape of the antenna radiation pattern, the upper region 15, which is at the base of tower 20 and is relatively flat, is aluminized or otherwise covered with a conductive coating. This flat region 15 is electrically grounded to the water by means of the remainder of body portion 14 which can be either entirely aluminized or partially aluminized in strips. The flatter region 15 is, the more effectively it will operate as a ground plane.

The advantage of this ground plane in the actual operation of the radiosonic buoy, or sonobuoy, is that as the tower 20 and antenna 22 weave and bob in the water, the ground plane will follow this motion and the actual pattern of the antenna array will not change. Ideally, the radius of the ground plane should be equal to ¼ wavelength of the transmitted frequency, or in the case of the present invention, equal to the length of antenna 22. In some cases, this large diameter will not be readily feasible, but even a smaller diameter is effective.

The conductive coating may be applied either to the outside or inside of the balloon since in actual operation the only requirement is that the ground plane be connected to the water, and the water floods both the inside and the outside of the bottom of the balloon.

The invention provides, therefore, a simple and inexpensive assembly. As described, the assembly of the invention performs the quadruple function of providing an air brake for the dropped equipment during its descent, a buoyant member to maintain the equipment at or near the surface of the body of water into which it has fallen, a rigid support for the antenna, and a ground plane which follows the motion of the antenna.

While a particular embodiment of the invention has been shown and described, it is apparent that modifications may be made. The following claims are intended to cover all such modifications which fall within the scope of the invention.

We claim:

1. A radiosonic-buoy assembly adapted to be dropped from an aircraft into a body of water, said assembly including:
   (a) a collapsible balloon-like member formed of an airtight flexible material having a generally pear-shaped body portion and a substantially restricted open-mouth portion at the lower extremity of said body portion, said mouth portion having a reduced diameter approximately one-third to one-half the diameter of said body portion,
   (b) a collapsible tower of airtight flexible material integrally mounted on said balloon-like member at the upper extremity thereof, the interior of said tower being coupled to the interior of said body portion of said balloon-like member,
   (c) a radiosonic-buoy unit,
   (d) a plurality of shroud lines affixed to said balloon-like member for suspending said radiosonic-buoy unit from the lower extremity of said balloon-like member in a position such as to cause said body portion of said balloon-like member and said tower to become gradually inflated by air introduced through said restricted open-mouth portion during the descent of said assembly so that said balloon-like member functions as a brake wherein the drag initially increases slowly, and in a position which causes said buoy unit to draw said restricted open-mouth portion down below the surface of said body of water at the termination of said descent so as to trap the air in said body portion and thereby to provide buoyancy for said assembly, and
   (e) an antenna for said radiosonic-buoy unit coupled thereto and extending up into said tower and affixed to the upper extremity of said tower.

2. An assembly for an article to be dropped into a body of liquid, comprising:
   (a) a member including a body portion having an opening at its lower extremity, said opening having a substantially reduced diameter as compared to the diameter of said body portion,
   (b) means affixed to said member for suspending an article from the lower extremity thereof in a position such as to cause said body portion to become gradually inflated by air which is introduced through said opening during the descent of said assembly, and in a position which causes said opening to be drawn below the surface of said body of liquid at the termination of said descent so as to trap the air in said body portion and thereby to provide buoyancy for said article, and
   (c) a tower mounted on said member at the upper extremity thereof, said tower being coupled to said body portion so that said tower is inflated by the air introduced into said body portion through said opening, and the region of said body portion where it is coupled to said tower being electrically conductive, said conductive region in contact with said body of liquid so as to create a ground plane when said assembly floats in said body of liquid.

3. An assembly for an article to be dropped from an elevated position into a body of water, said assembly including:
   (a) a collapsible balloon-like member formed of an air-tight flexible material having a body portion and a restricted open-mouth portion at the lower extremity of said body portion, said mouth portion having transverse dimensions approximately one-third to one-half the transverse dimensions of said body portion,
   (b) a plurality of shroud lines affixed to said balloon-like member for suspending said article from the lower extremity of said balloon-like member in a position such as to cause said body portion to become gradually inflated by air introduced through said restricted mouth portion during the descent of said assembly, so that said balloon-like member functions as a brake wherein the drag initially increases slowly, and in a position which causes said restricted open-mouth portion to be drawn down below the surface of said body of water at the termination of said descent so as to trap the air in said body portion and thereby to provide buoyancy for said assembly,
   (c) a collapsible tower of airtight flexible material integrally mounted on said collapsible balloon-like member at the upper extremity thereof, the interior of said tower being coupled to the interior of said body portion to enable said tower to be inflated by the air introduced into said body portion through said restricted mouth portion, and (d) an antenna for said article, said antenna extending up into said tower, and the region of said body portion where it is coupled to said tower being electrically conductive, said conductive region in contact with said body of liquid so as to create a ground plane for said antenna when said assembly floats in said body of water.

4. A radiosonic-buoy assembly adapted to be dropped from an aircraft into a body of water, said assembly including:

(a) a collapsible balloon-like member formed of an airtight flexible material having a generally pear-shaped body portion and a restricted open-mouth portion at the lower extremity of said body portion, said mouth portion having a reduced diameter one-third the diameter of said body portion, (b) a collapsible tower of airtight flexible material integrally mounted on said balloon-like member at the upper extremity thereof, the interior of said tower being coupled to the interior of said body portion of said balloon-like member, (c) a radiosonic-buoy unit, (d) a plurality of shroud lines affixed to said balloon-like member for suspending said radiosonic-buoy unit from the lower extremity of said balloon-like member in a position such as to cause said body portion of said balloon-like member and said tower to become gradually inflated by air introduced through said restricted open-mouth portion during the descent of said assembly so that said balloon-like member functions as a brake wherein the drag initially increases slowly, and in a position which causes said buoy unit to draw said restricted open-mouth portion down below the surface of said body of water at the termination of said descent so as to trap the air in said body portion and thereby to provide buoyancy for said assembly, and (e) an antenna for said radiosonic-buoy unit coupled thereto and extending up into said tower and affixed to the upper extremity of said tower, and the region of said body portion where it is coupled to said tower being relatively flat and aluminized, said aluminized region being in contact with said body of water so as to operate as a ground plane for said antenna when said assembly floats in said body of water.

References Cited by the Examiner

UNITED STATES PATENTS

| | | | |
|---|---|---|---|
| 2,358,582 | 9/1944 | Little | 244—145 |
| 2,382,442 | 8/1945 | Rich et al. | 244—138 |
| 2,907,875 | 10/1959 | Seyfang | 343—709 X |
| 2,993,667 | 7/1961 | Cushman | 244—142 |
| 3,061,249 | 10/1962 | Chipperfield | 244—138 |
| 3,081,466 | 3/1962 | Bailey | 340—2 X |
| 3,095,568 | 6/1963 | Aine et al. | 343—709 |

LEWIS H. MYERS, *Primary Examiner.*

CHESTER L. JUSTUS, *Examiner.*